(12) United States Patent
Goossens et al.

(10) Patent No.: US 11,975,707 B2
(45) Date of Patent: May 7, 2024

(54) SYSTEMS AND METHODS FOR TORQUE OUTPUT CONTROL

(71) Applicant: Dana Belgium N.V., Flanders (BE)

(72) Inventors: Stijn Goossens, Erpe-Mere (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 356 days.

(21) Appl. No.: 17/457,389

(22) Filed: Dec. 2, 2021

(65) Prior Publication Data

US 2023/0174051 A1 Jun. 8, 2023

(51) Int. Cl.
| | |
|---|---|
| *B60W 20/19* | (2016.01) |
| *B60W 10/02* | (2006.01) |
| *B60W 10/08* | (2006.01) |
| *B60W 30/18* | (2012.01) |
| *B60W 30/188* | (2012.01) |

(52) U.S. Cl.
CPC .......... *B60W 20/19* (2016.01); *B60W 10/026* (2013.01); *B60W 10/08* (2013.01); *B60W 30/18027* (2013.01); *B60W 30/1888* (2013.01); *B60W 2510/083* (2013.01); *B60W 2710/021* (2013.01); *B60W 2710/081* (2013.01); *B60W 2710/083* (2013.01)

(58) Field of Classification Search
CPC .... B60W 20/19; B60W 10/026; B60W 10/08; B60W 30/18027; B60W 30/1888; B60W 2510/083; B60W 2710/021; B60W 2710/081; B60W 2710/083; B60W 10/30; B60W 30/18054; B60W 10/02; B60W 10/06; B60W 10/115; B60W 20/10; B60K 6/387; B60K 2006/381; B60K 6/547; B60K 17/28; B60K 6/445; B60K 17/02; B60K 17/06; Y02T 10/62
See application file for complete search history.

(56) References Cited

U.S. PATENT DOCUMENTS

| | | | |
|---|---|---|---|
| 7,421,886 B1 * | 9/2008 | Fox ...................... | B25J 19/0095 73/40.7 |
| 7,610,976 B2 | 11/2009 | Holmes et al. | |
| 8,182,395 B2 * | 5/2012 | Jonsson ............ | B60W 30/1888 477/110 |
| 8,813,881 B2 * | 8/2014 | Gibson ................. | B60W 20/40 180/53.1 |

(Continued)

FOREIGN PATENT DOCUMENTS

EP 1396369 A2 3/2004

*Primary Examiner* — Mary Cheung
(74) *Attorney, Agent, or Firm* — McCoy Russell LLP

(57) ABSTRACT

Methods and systems are provided for a vehicle. In one example, a method for the vehicle includes adjusting an output torque of an electric machine to produce a desired vehicle speed and direction of propulsion while operating an auxiliary load powered via the transmission. The output torque may be adjusted while disengaging clutches of a transmission or a service brake to mechanically unlock an output shaft of the transmission. The first electric machine may be operated in a speed control to learn an amount to torque to hold the vehicle speed at zero and the amount of learned torque may be superimposed with an amount of requested torque upon vehicle launch.

20 Claims, 4 Drawing Sheets

(56) References Cited

U.S. PATENT DOCUMENTS

| | | | | |
|---|---|---|---|---|
| 11,655,863 B1* | 5/2023 | Versini | ................ | B60K 17/28 |
| | | | | 475/5 |
| 2006/0070776 A1* | 4/2006 | Morrow | ................ | B60K 17/28 |
| | | | | 180/65.1 |
| 2007/0256870 A1* | 11/2007 | Holmes | ................ | B60W 20/00 |
| | | | | 903/910 |
| 2008/0243324 A1* | 10/2008 | Harris | ................ | B60W 20/00 |
| | | | | 903/902 |
| 2011/0136625 A1* | 6/2011 | Yu | ................ | B60W 10/06 |
| | | | | 903/902 |
| 2013/0292195 A1* | 11/2013 | Gibson | ................ | B60K 17/28 |
| | | | | 180/53.1 |
| 2016/0281821 A1* | 9/2016 | Matsuura | ................ | B60K 17/34 |
| 2020/0325964 A1 | 10/2020 | Kimes | | |
| 2021/0018072 A1* | 1/2021 | Steinberger | ............ | B60K 6/445 |

\* cited by examiner

SYSTEMS AND METHODS FOR TORQUE OUTPUT CONTROL

TECHNICAL FIELD

The present description relates generally to methods and systems for controlling a powertrain torque output under influence of an auxiliary load.

BACKGROUND AND SUMMARY

An electric powertrain of a vehicle may be configured to operate one or more auxiliary loads through a device such as a power take-off (PTO) to allow energy from the powertrain's energy source to be transmitted to the one or more auxiliary loads. For example, a fire truck may rely on one or more PTOs to drive a hydraulic pump. The one or more PTOs may allow engine power or electric motor power to be transferred to the hydraulic pump to enable high pressure flow of water through a fire hose.

In some examples, it may be desirable to engage the PTO while the vehicle is stationary and continue powering an auxiliary load via the PTO during vehicle launch and subsequent vehicle navigation. At vehicle launch, however, engagement of the PTO by the powertrain may adversely affect a torque output of the powertrain. For example, torque may be provided in a direction opposite of an intended launch direction of the vehicle, leading to excessive throttle pedal depression in order to correct the torque output direction. Furthermore, electric motors used to transfer electrical energy from an energy storage device to mechanical energy at the powertrain may be burdened with large loads during vehicle launch while operating the auxiliary load. Losses at the electric motors and a likelihood of overheating may be exacerbated upon subjecting the electric motors to the loads.

Attempts to address torque control under influence of an auxiliary load may include dynamic estimation of an amount of torque delivered to the PTO or to an output shaft of the powertrain, for example. As another example, accurate information regarding a load imposed on an input shaft of the powertrain may be obtained. In both examples, however, undesirably high costs and complexity may be added to the powertrain system upon implementation.

In one example, the issues described above may be addressed by a method for a vehicle, including adjusting an output torque of a first electric machine, while disengaging clutches of a transmission or a service brake to mechanically unlock an output shaft of the transmission, to produce a desired vehicle speed and direction of propulsion while operating an auxiliary load powered via the transmission. In this way, the vehicle may launch smoothly while operating the auxiliary load continuously.

As one example, the transmission may be a multi-mode inline electromechanical variable transmission including a low clutch and a mid clutch. The low clutch and the mid clutch may be used to ground the output shaft, allowing multiple power sources of the transmission to be available while the vehicle is stationary. The first electric machine may therefore be used to provide torque to the output shaft when the clutch is released by operating in a speed control mode to learn an amount of torque demanded to maintain the vehicle speed at zero. The auxiliary load is powered by another of the power sources. When additional torque is requested, e.g., based on depression of a throttle pedal, the requested amount of torque may be added to the learned torque. Launch of the vehicle is thereby powered independent of operation of the auxiliary load, allowing the torque upon to be provided according to the requested vehicle speed and direction. Furthermore, launch of the vehicle while operating the auxiliary load may be similarly executed regardless of a slope of the vehicle without demanding use of slope sensors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
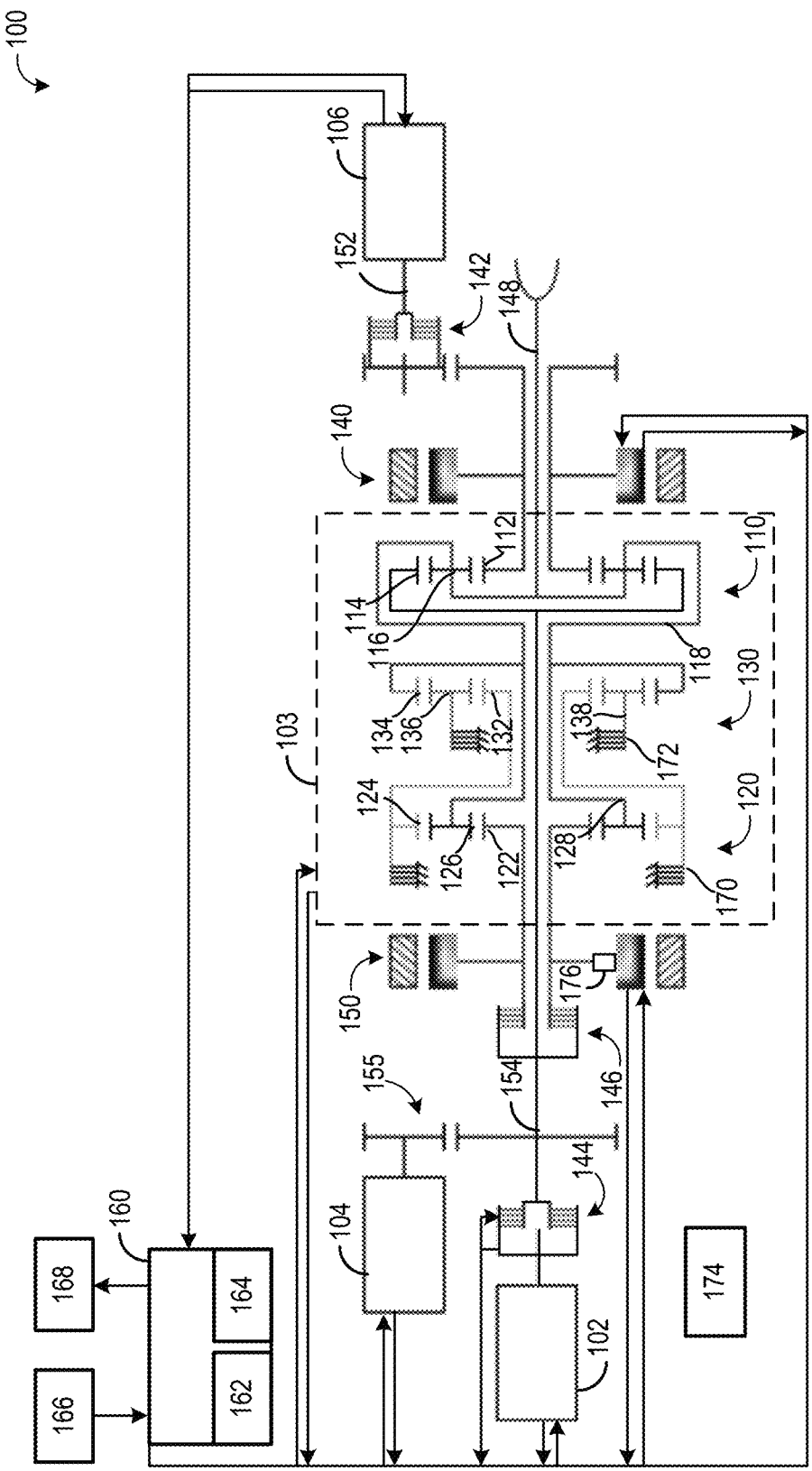
FIG. 1 shows an example of an electric powertrain of a vehicle, the electric powertrain configured to power one or more auxiliary loads.
Figure 3:
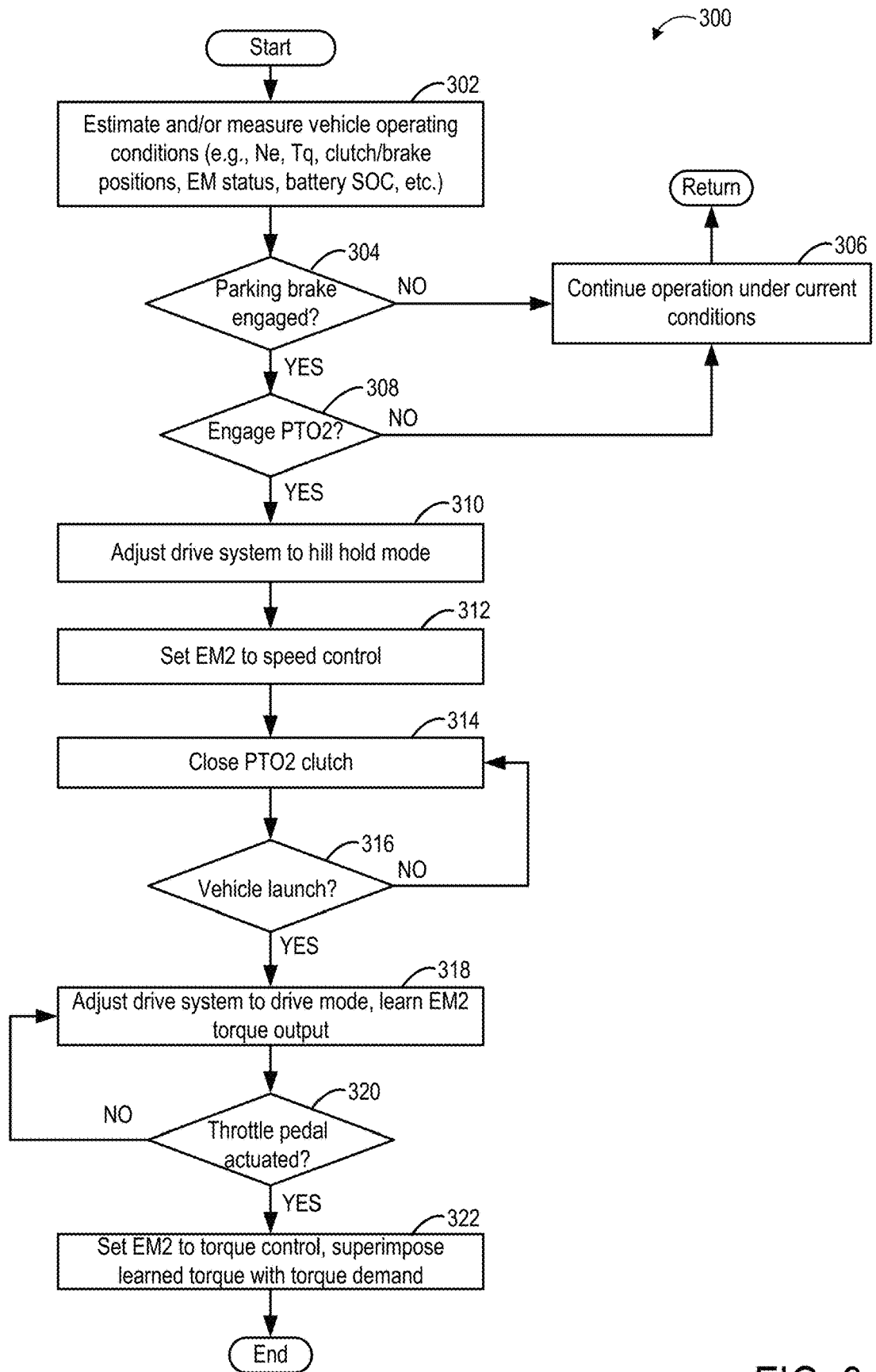
FIG. 3 shows an example of a method for launching a vehicle under influence of one or more auxiliary loads.
Figure 4:
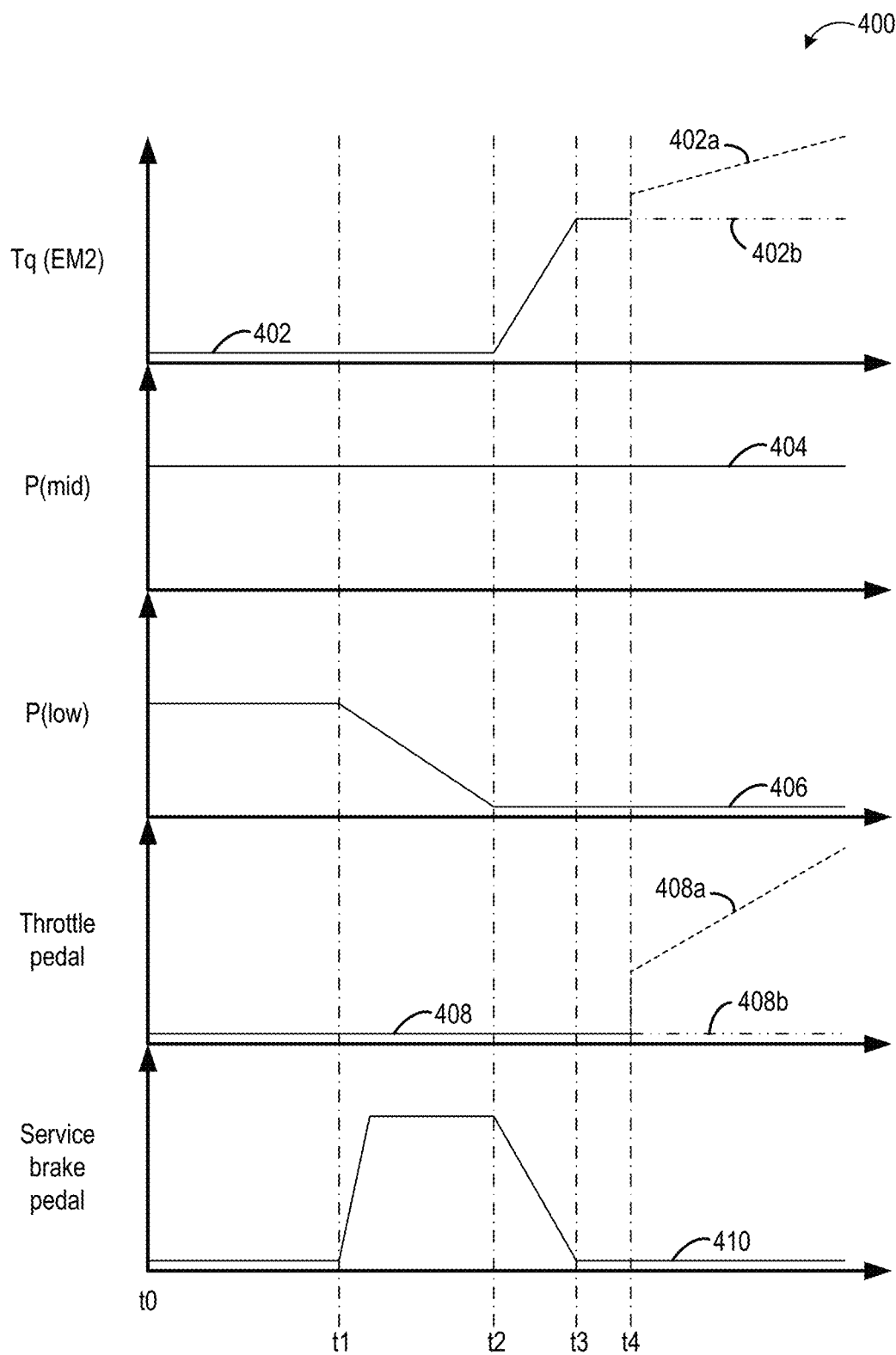
FIG. 4 shows example operations during launching of a vehicle under influence of one or more auxiliary loads.

The following description relates to systems and methods for controlling a torque output of a vehicle powertrain. In one example, the powertrain may be driven both electrically and by an engine and may be configured to transfer power to one or more auxiliary loads. Each of the one or more auxiliary loads may be coupled to the powertrain by a power take-off device (PTO). The powertrain may include more than one electric motor coupled to planetary gear sets, as shown in FIG. 1. In one example, the PTO may be energized while the vehicle is stationary. While stationary, the powertrain may be adjusted to a hillhold mode, allowing the PTO to be engaged by the powertrain. An electric motor of the powertrain may be adjusted between a speed control mode and a torque control mode to enable coordination of torque output at the powertrain output shaft with a requested direction of torque as indicated by an operator. An example of a method for controlling the torque output during vehicle launch while operating an auxiliary device is depicted in FIG. 3. Variations in operating parameters during launch of the vehicle while continuously supporting the auxiliary device is shown in FIG. 4.

FIG. 1 shows an embodiment of a drive system, e.g., a powertrain, for a vehicle, shown as drive system 100. In an exemplary embodiment of the method, the drive system may be implemented in an off-highway work machine. The various components of drive system 100 may be controlled by electronic drive system controller 160, which may be included in a vehicle control system. The drive system 100 may also include a transmission 103 having one or more clutches and a plurality of power inputs. The drive system may include a service brake 174, shown schematically. In one example, the service brake 174 may be applied to the vehicle's wheels (not shown). For example, the service brake may be hydraulically powered and may be actuated by an operator via a pedal (not shown). In another example, the service brake 174 may be automatically applied, such as when a decrease in speed of the vehicle is requested.

A first power input of the drive system may include a prime mover, such as engine 102. In some embodiments, engine 102 may be an internal combustion engine. The drive system may include at least a second power input from an electric machine. In another example, the transmission 103 may include at least two power inputs from the electric machine and another electric machine. The exemplary embodiment of FIG. 1 is depicted with a first electric machine, e.g., a first electromotor 140, and a second electric machine, e.g., a second electromotor 150. The transmission 103 may include both the first electromotor 140 and the second electromotor 150. In some examples, one or more of the first electromotor 140 and the second electromotor 150 may be configured as a motor/generator. The engine 102 may provide mechanical energy input to one or more of the electromotors such that the one or more of the electromotors operates as a generator. Electrical energy generated by the one or more of the electromotors may be used to power other vehicle systems, the other of the electromotors, etc., or may be stored at an energy storage device, such as a battery.

As shown in FIG. 1, the transmission 103 includes a first power transmission device or gear set, shown as power split planetary 110, a second power transmission device or gear set, shown as output planetary 120 (mid-range), and a third power transmission device or gear set, shown as output coupling planetary (low range) 130. One or more of the power split planetary 110, the output planetary 120, and the output coupling planetary 130 may be disposed between (e.g., sandwiched by) the first electromotor 140 and the second electromotor 150. For example, all three planetaries are positioned between the electromotors in FIG. 1. However, in another embodiment, the power split planetary 110, output planetary 120, and the output coupling planetary 130 may be positioned outside of (e.g., on either side of, sandwiching, not between) the first electromotor 140 and the second electromotor 150.

Continuing with the exemplary embodiment shown in FIG. 1, the power split planetary 110 may be a planetary gear set that includes a sun gear 112, a ring gear 114, and a plurality of planetary gears 116. The plurality of planetary gears 116 couple the sun gear 112 to the ring gear 114, according to an exemplary embodiment. As shown in FIG. 1, a carrier 118 rotationally supports the plurality of planetary gears 116. In one embodiment, the first electromotor 140 is directly coupled to the sun gear 112 such that the power split planetary 110 is coupled to the first electromotor 140. By way of example, the first electromotor 140 may include or be coupled to a shaft (e.g., a first shaft, an input shaft, an output shaft) directly coupled to the sun gear 112.

The output planetary 120 is a planetary gear set that includes a sun gear 122, a ring gear 124, and a plurality of planetary gears 126. The plurality of planetary gears 126 couple the sun gear 122 to the ring gear 124, according to an exemplary embodiment. As shown in FIG. 1, a carrier 128 rotationally supports the plurality of planetary gears 126. In one embodiment, the second electromotor 150 is directly coupled to the sun gear 122 such that the output planetary 120 is coupled to the second electromotor 150. By way of example, the second electromotor 150 may include or be coupled to a shaft (e.g., a second shaft, an input shaft, an output shaft) directly coupled to the sun gear 122. The carrier 118 is directly coupled to the carrier 128, thereby coupling the power split planetary 110 to the output planetary 120, according to the exemplary embodiment of FIG. 1. In one embodiment, directly coupling the carrier 118 to the carrier 128 synchronizes the rotational speeds of the carrier 118 and the carrier 128.

The output coupling planetary 130 is a planetary gear set that includes a sun gear 132, a ring gear 134, and a plurality of planetary gears 136. The plurality of planetary gears 136 couple the sun gear 132 to the ring gear 134, according to an exemplary embodiment. As shown in FIG. 1, a carrier 138 rotationally supports the plurality of planetary gears 136. In one embodiment, the sun gear 132 is directly rotationally coupled to (e.g., fixed directly to) the ring gear 124 such that the output coupling planetary 130 is directly coupled to the output planetary 120. The ring gear 134 is directly coupled to the output planetary 120. The ring gear 134 is directly rotationally coupled to the carrier 118 and the carrier 128 thereby coupling the power split planetary 110 and the output planetary 120 to the output coupling planetary 130, according to an exemplary embodiment shown in FIG. 1. Accordingly, the ring gear 124 of the output planetary 120 is coupled to the carrier 118 and the carrier 128 through the output coupling planetary 130. In some embodiments, the carrier 118 and/or the carrier 128 extend through the output coupling planetary 130. In some embodiments, the output coupling planetary 130 is positioned between the output planetary 120 and the power split planetary 110.

The carrier 118 is directly rotationally coupled to an output with a first shaft, shown as output shaft 148, according to the exemplary embodiment shown in FIG. 1. A second shaft, shown as secondary output shaft 152, is selectively coupled to the output shaft 148 by a neutral disconnect clutch, shown as secondary output clutch 142, also referred to as a PTO2 clutch 142, according to the exemplary embodiment shown in FIG. 1. The PTO2 clutch 142 is positioned to selectively couple the output shaft 148 with the secondary output shaft 152, according to an exemplary embodiment. The PTO2 clutch 142 may thereby selectively couple the carrier 118 and the carrier 128 to the secondary output shaft 152. As shown in FIG. 1, the output shaft 148 extends from the power split planetary 110, through the first electromotor 140, and out to the PTO2 clutch 142.

The secondary output shaft 152 may be coupled to at least one rear axle driveshaft and front axle driveshaft (not shown). By way of example, the secondary output shaft 152 may be coupled to a transfer case (not shown) and/or the rear axle driveshaft where the transmission 103 is installed in place of a traditional, mechanical, straight-thru transmission. In an exemplary embodiment, the output is a second power take-off (PTO) output, herein referred to as PTO2 106, and the secondary output shaft 152 is coupled thereto. A first power take-off 104, hereafter PTO1 104, is also included in the drive system 100, coupled to a connecting shaft 154 of the drive system 100 by a gear set 155. A clutch assembly may be engaged and disengaged to selectively couple at least one of the front axle driveshaft, a transfer case, and the rear axle driveshaft to the secondary output shaft 152 (e.g., to facilitate operation of a vehicle in a rear-wheel-drive mode, an all-wheel-drive mode, a four-wheel-drive mode, a front-wheel-drive mode, etc.).

The PTO2 106 may be a device or mechanism for transferring power from a power source, such as the engine 102, the first electromotor 140, or the second electromotor 150, to an auxiliary application or device. For example, the PTO2 106 may deliver power from the power source, through the transmission 103 and the secondary output shaft 152, to at least one of a hydraulic pump, a generator, a compressor, a vacuum pump, etc. When operating the auxiliary device via the PTO2 106, an auxiliary load may be imposed on the power source. Adjustments to other vehicle operations, such as vehicle propulsion, may be conducted to compensate for the additional torque demand. For example, when the vehicle is stationary and the PTO2 106 is activated to deliver power to the auxiliary load from a prime mover of the vehicle, an amount of torque output to enable subsequent vehicle launch while operating the auxiliary application may differ from an amount demanded for launch without any auxiliary loads. Furthermore, a direction of torque output during vehicle launch may be affected by the auxiliary load.

For example, a gearing of a transmission, e.g., an arrangement of the various gear sets, may enable rotation of an output shaft in a first direction suitable for forward propulsion of a vehicle. When an operator requests forward motion of the vehicle, e.g., by shifting a gearbox of the vehicle to a drive gear, depressing a throttle or accelerator pedal, without powering a PTO, the transmission may be adjusted to drive rotation of the output shaft in the first direction, thereby driving the vehicle wheels in a forward direction. Similarly, when the operator requests reverse, e.g., rearward motion, of the vehicle by shifting the gearbox of the vehicle to a reverse gear, the transmission may be adjusted to drive rotation no the output shaft in a second direction, opposite of the first direction. However, when an auxiliary load is imposed and the PTO is actively transferring power to the auxiliary load, the transmission may be operated in a configuration that may or may not correspond to a desired direction of vehicle propulsion when vehicle propulsion is requested.

As an example, the operator may adjust the gearbox of the vehicle to the reverse gear, expecting immediate rearward motion of the vehicle in response to depression of the throttle pedal. However, operation of the PTO may result in the output shaft already rotating in the first direction. Thus, during vehicle launch, rotation of the output shaft in the first direction may drive rotation of the vehicle wheels in the forward direction rather than the requested rearward direction. In some instances, in order to adjust the direction of the output shaft, increased depression of the throttle pedal may be demanded to indicate that the output shaft rotation is to be reversed. The operator may experience an unnatural driving behavior as a result.

In another example, operation of the PTO while the vehicle is parked on a hill in a hill hold mode, e.g., a transmission mode that inhibits rollback along a slope of the hill during vehicle launch, may further burden one or more power inputs of the transmission, such as the electric motors and the engine. During vehicle launch from the hill hold mode, one or more of the power inputs of the transmission may be operated to generate sufficient torque to enable a smooth vehicle launch without rollback. The additional load on the one or more of the power inputs due to operation of the PTO may increase a likelihood of overheating and may exacerbate electrical losses. Furthermore, vehicle launch in the hill hold mode under influence of the auxiliary load may cause undesirable vehicle acceleration.

By implementing the transmission 103 as shown in FIG. 1, a configuration of the transmission 103 may be leveraged to allow the PTO to be activated while the vehicle is stationary, whether on a level grade or a slope, without relying on the power inputs to maintain the transmission in a hill hold mode. Subsequent vehicle launch may be executed with a torque that is output in a direction corresponding to a requested direction and provides acceleration responsive to depression of the throttle pedal. Methods for vehicle launch under influence of the auxiliary load are shown in FIGS. 3-4 and described further below. Therein, the second electromotor 150 may be adjusted between a speed control mode and a torque control mode to enable smooth vehicle launch while the PTO2 106 is powered continuously, without relying on accurate load estimates or slope sensors.

Returning to FIG. 1, the transmission 103 includes a shaft, shown as connecting shaft 154. A clutch, shown as neutral clutch 144, is positioned to selectively couple the engine 102 to the connecting shaft 154. The neutral clutch 144 may be a component of the engine 102 or the transmission 103 or a separate component. According to an exemplary embodiment, the neutral clutch 144 and connecting shaft 154 directly couple the engine 102 to the power split planetary 110. In one embodiment, the neutral clutch 144 and connecting shaft 154 directly couple the engine 102 with the ring gear 114 of the power split planetary 110. According to an alternative embodiment, the neutral clutch 144 is omitted, and connecting shaft 154 is directly coupled to the engine 102.

As shown in FIG. 1, the transmission 103 includes a first clutch, shown as input coupled clutch 146. In one example, the input coupled clutch 146 may also be a high clutch. The input coupled clutch 146 is positioned to selectively couple the second electromotor 150 with the engine 102 and the connecting shaft 154, according to an exemplary embodiment. The input coupled clutch 146 may thereby selectively couple the engine 102 to the output planetary 120. As shown in FIG. 1, the connecting shaft 154 extends from the neutral clutch 144, through the input coupled clutch 146 and the second electromotor 150, and through the output planetary 120 and the output coupling planetary 130 to the power split planetary 110. The input coupled clutch 146 may selectively couple the second electromotor 150 with connecting shaft 154. Accordingly, the input coupled clutch 146 may selectively couple the connecting shaft 154 to the sun gear 122 of the output planetary 120. According to an exemplary embodiment, the first electromotor 140 and the second electromotor 150 (e.g., input/output shafts thereof, etc.) are aligned (e.g., radially aligned, etc.) with the power split planetary 110, the output planetary 120, the output coupling planetary 130, the connecting shaft 154, the output shaft 148, and/or the secondary output shaft 152 (e.g., centerlines thereof are aligned, to thereby form a straight-thru or inline transmission arrangement, etc.).

According to the exemplary embodiment shown in FIG. 1, the transmission 103 further includes a second clutch or brake, shown as a low clutch 172. The low clutch 172 is positioned to selectively inhibit movement of the carrier 138 (e.g., by coupling the carrier 138 to a housing of the transmission 103), according to an exemplary embodiment. When the movement of the carrier 138 is limited (e.g., prevented), the sun gear 132 is coupled to the ring gear 134 through the plurality of planetary gears 136 such that a rotation of the sun gear 132 causes a corresponding rotation of the ring gear 134. Accordingly, the low clutch 172 may thereby selectively couple the ring gear 124 to the carrier 118 and the carrier 128.

In some embodiments, the neutral clutch 144 is biased into an engaged position (e.g., with a spring, etc.) and selectively disengaged (e.g., with application of pressurized hydraulic fluid, etc.). In some embodiments, the input coupled clutch 146 is biased into a disengaged position (e.g., with a spring, etc.) and selectively engaged (e.g., with application of pressurized hydraulic fluid, etc.). In some embodiments, the low clutch 172 is biased into a disengaged position (e.g., with a spring, etc.) and selectively engaged (e.g., with application of pressurized hydraulic fluid, etc.). In some embodiments, the PTO2 clutch 142 is biased into an engaged position (e.g., with a spring, etc.) and selectively disengaged (e.g., with application of pressurized hydraulic fluid, etc.). In other embodiments, one or more of the neutral clutch 144, the input coupled clutch 146, the low clutch 172, and the PTO2 clutch 142 are hydraulically biased and spring released.

Referring again to the exemplary embodiment shown in FIG. 1, the transmission 103 includes another brake or clutch, shown as the mid clutch 170. The mid clutch 170 is positioned to selectively inhibit the movement of at least a portion of the output planetary 120 (e.g., the ring gear 124, etc.), according to an exemplary embodiment. In one embodiment, the mid clutch 170 is biased into a disengaged position (e.g., with a spring, etc.) and selectively engaged (e.g., with application of pressurized hydraulic fluid, etc.). In other embodiments, the mid clutch 170 is hydraulically biased and spring released. In still other embodiments, the components of the transmission 103 are still otherwise engaged and disengaged (e.g., pneumatically, etc.). By way of example, the mid clutch 170 and the low clutch 172 may be engaged simultaneously, providing a driveline brake such that rotational movement of at least one of the output coupling planetary 130 (e.g., the sun gear 132, the ring gear 134, the plurality of planetary gears 136, and the carrier 138, etc.), the output planetary 120 (e.g., the ring gear 124, etc.), the power split planetary 110 (e.g., the carrier 118, etc.), and the output shaft 148 are selectively limited.

According to the exemplary embodiment shown in FIG. 1, the drive system 100 includes a controller 160. In one embodiment, the controller 160 is configured to selectively engage, selectively disengage, or otherwise communicate with components of the drive system 100 according to various modes of operation. As shown in FIG. 1, the controller 160 is coupled to the engine 102. In one embodiment, the controller 160 is configured to selectively engage the engine 102 (e.g., interface with a throttle thereof, etc.) such that an output of the engine 102 rotates at a target rate. The controller 160 is coupled to the first electromotor 140 and the second electromotor 150, according to an exemplary embodiment, and may send and receive signals therewith. By way of example, the controller 160 may send command signals relating to at least one of a target mode of operation, a target rotational speed, and a target rotation direction for the first electromotor 140 and the second electromotor 150. The first electromotor 140 and the second electromotor 150 may be electrically coupled (e.g., by an electrical power transmission system, etc.). By way of example, power generated by the first electromotor 140 may be utilized by the second electromotor 150 (e.g., to provide an output torque as a motor, etc.), or power generated by the second electromotor 150 may be utilized by the first electromotor 140 (e.g., to provide an output torque as a motor, etc.).

The controller 160 is configured to selectively engage and selectively disengage the neutral clutch 144, the PTO2 clutch 142, the input coupled clutch 146, the low clutch 172, and the mid clutch 170 directly or by interacting with another component (e.g., a pump, a valve, a solenoid, a motor, etc.). The controller 160 may receive information from a plurality of sensors 166 and may send control signals to a plurality of actuators 168. The plurality of sensors 166 may include, for example, a pedal position sensor for monitoring a position of the service brakes, speed sensors coupled to the input shaft and/or output shaft, various engine sensors such as a Hall sensor for determining engine speed, mass flow sensors for measuring air flow, etc. In one embodiment, a speed sensor 176 may be coupled to the second electromotor 150. The speed sensor 176 may estimate speed via an encoder coupled to the output shaft 148.

In one example, a proportional-integral controller of the controller 160 may be in communication with the speed sensor 176. The plurality of actuators 168 may include, for example, the various clutches and brakes of transmission 103, as described above, as well as various other types of actuators such as valves, pumps, injectors, etc. The controller 160, while overseeing control and management of the drive system, may be configured to receive signals from the plurality of sensors 166, as further elaborated herein, in order to determine operating parameters and operating conditions, and correspondingly adjust various the plurality of actuators 168 to control operation of the drive system. In one example, the controller 160 may operate one or more control modes (e.g. speed control, torque control) of the second electromotor 150 based on signals received from the speed sensor 176.

According to the exemplary embodiment shown in FIG. 1, the controller 160 includes a processor 162 and a memory 164. In some embodiments, the processor 162 is configured to execute computer code stored in the memory 164 to facilitate the activities described herein, such as described herein with regard to the operations of FIGS. 3-4. The memory 164 includes various actuation profiles corresponding to modes of operation (e.g., for the transmission 103, for drive system 100, for a vehicle, etc.), according to an exemplary embodiment. The hardware and data processing components used to implement the various processes, operations, illustrative logics, logical blocks, modules and circuits described in connection with the embodiments disclosed herein may be implemented or performed with a general purpose single or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory 164 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 164 may be or include volatile memory or non-volatile memory, and may include database components, object code components, script components, or any other type of information structure for supporting the various activities and information structures described in the present disclosure. According to an exemplary embodiment, the memory 164 is communicably connected to the processor 162 via a processing circuit and includes computer code for executing (e.g., by the processing circuit or the processor 162) the one or more processes described herein.

Figure 2:
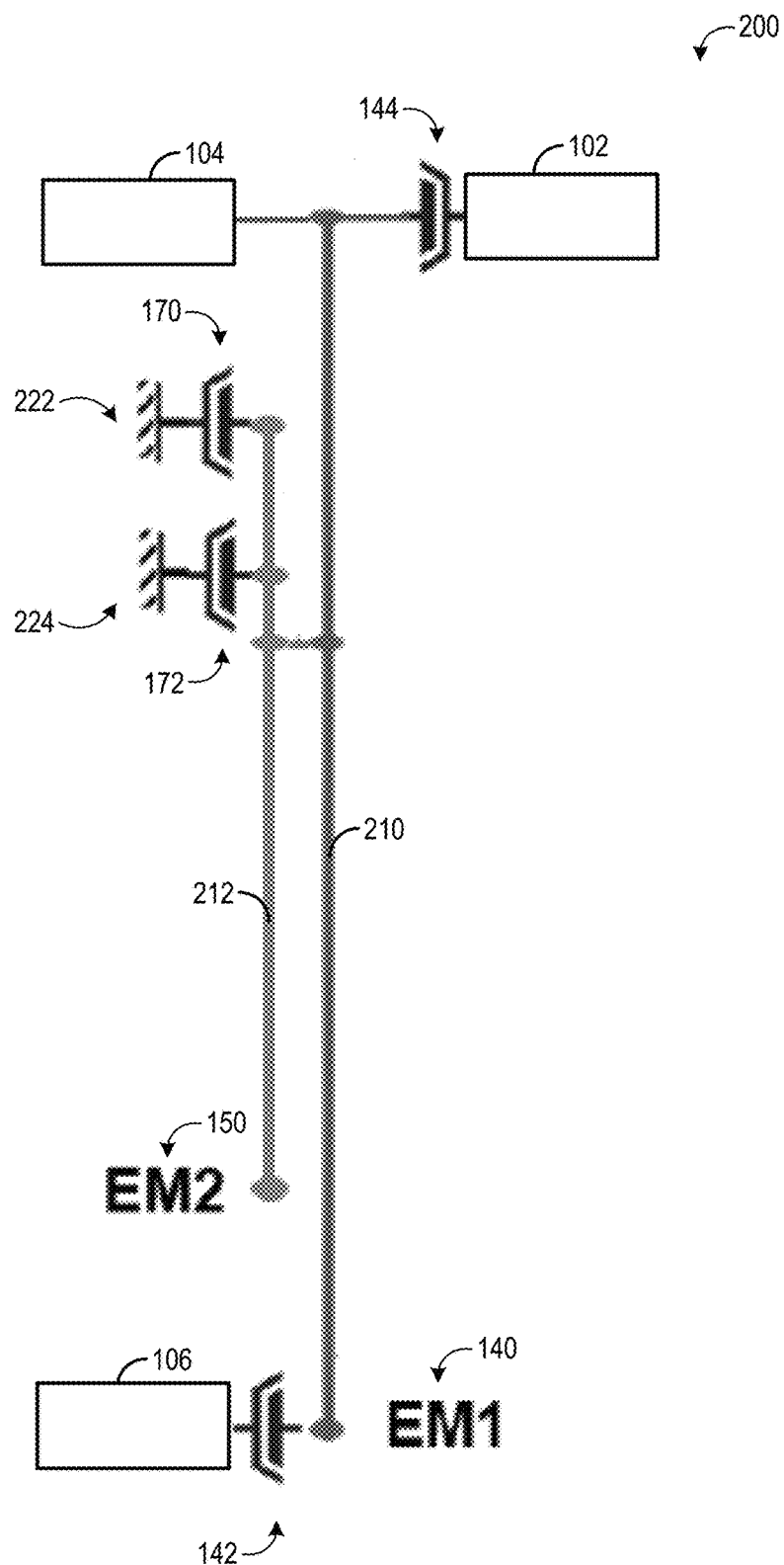
FIG. 2 shows a lever diagram representation of the electric powertrain of FIG. 1 with a high clutch maintained open.

FIG. 2 is a lever representation of the drive system 100 of FIG. 1, depicted as a dual lever system 200. The lever representation illustrates a configuration of the drive system 100 where the input coupled clutch 146 is open, e.g., disengaged, which may be utilized during vehicle operation at low speeds. Each vertical lever of the dual lever system denotes one or more planetary gear sets. For example, a first vertical lever 210 represents the power split planetary 110 and a second vertical lever 212 represents a combination of the output coupling planetary 130 and the output planetary 120. For the first vertical lever 210, torque corresponding to the engine 102 and the first electromotor 140, is balanced by torque corresponding to the PTO1 and the PTO2. For the second vertical lever 212, torque corresponding to the power split planetary 110 is balanced by torque corresponding to the mid clutch 170, the low clutch 172, and the second electromotor 150. As described above, with reference to FIG. 1, the engine 102 is coupled to/decoupled from the power split planetary 110 of FIG. 1 by the neutral clutch 144 and the PTO2 106 is coupled to/decoupled from the power split planetary by the PTO2 clutch 142.

The mid clutch 170 may ground to the frame of the vehicle (not shown) at a first fixed component 222. The low clutch 172 may ground to the frame of the vehicle (not shown) at a second fixed component 224. In one example, the first and second fixed components 222, 224 may be the housing of the transmission 103 of FIG. 1. As such, the mid clutch 170 and the low clutch 172 may be engaged in a hill hold mode of the transmission to lock the second vertical lever 212 (e.g., output coupling planetary 130 and the output planetary 120 of FIG. 1) when immobilization of the vehicle is desired, such as when the vehicle is parked. By locking the second vertical lever 212 with the mid and low clutches 170, 172, the drive system 100 may be grounded and the output shaft 148 mechanically locked. Furthermore, neither the engine 102 or the electromotors are used to lock the second vertical lever 212. Instead, either the engine 102 or the first electromotor 140 may be used to power the PTO2 106 and the second electromotor 150 may be operated in a speed control mode during vehicle launch with the transmission adjusted to a launch or drive mode.

In the speed control mode, an amount of torque provided by the second electromotor 150 to maintain the vehicle stationary, e.g., at a zero speed setting, may be estimated. When the service brakes of the vehicle are fully released, where the service brakes are initially engaged upon shifting of a vehicle gearbox into a drive gear (e.g., in a forward or reverse vehicle direction) the second electromotor 150 is adjusted to a torque control mode. As such, the amount of torque estimated during operation of the second electromotor 150 in the speed control mode may be added to an amount of torque requested based on engagement of a throttle pedal. In some instances, in order to simulate creep torque as the service brakes are released, a speed set point of the second electromotor 150, while in the speed control mode, may be ramped up according to a change in pressure at the service brakes.

By using the mid and low clutches of the transmission to lock the output shaft, rather than power sources of the drive system, a torque output of the transmission may be delivered in a direction matching a requested direction of vehicle propulsion. In addition, torque may be delivered to the PTO2 continuously during vehicle launch without imposing large loads on the electromotors or engine that may lead to overheating. Furthermore, the methods described above, and further elaborated below with reference to FIGS. 3-4, may allow the vehicle to launch from a slope without rollback.

Turning now to FIG. 3, an example of a method 300 for controlling a torque output of a drive system for a hybrid electric vehicle (HEV) is shown. The drive system may be the drive system 100 of FIG. 1, including an engine, a first electromotor, a second electromotor, a PTO1, a PTO2, and a multi-mode inline electromechanical variable transmission. The transmission may be equipped with planetary gear sets and various brakes and clutches as depicted in FIG. 1. For example, the clutches may include a PTO2 clutch configured to engage/disengage a PTO2 from the transmission. The PTO2, in turn, may provide torque from the transmission to an auxiliary device. Instructions for carrying out method 300 may be executed by a controller, such as the controller 160 of FIG. 1, based on instructions stored on a memory of the controller and in conjunction with signals received from sensors of the vehicle system, such as the sensors described above with reference to FIG. 1. The controller may employ actuators of the vehicle system to adjust vehicle operation, according to the method described below.

At 302, the method includes estimating and/or measuring vehicle operating conditions. For example, an engine speed, vehicle speed, torque demand, statuses of the electromotors, a battery state of charge, positions of the brakes and clutches of the transmission, etc., may be determined based on feedback from the vehicle sensors.

Engagement of a parking brake of the vehicle is confirmed at 304 of the method. In some examples, engagement of the parking brake may also include shifting of a vehicle gear box to a parking gear. For example, the controller may obtain data from a parking brake sensor to determine whether the parking brake is engaged. If the parking brake is not engaged, the vehicle may or may not be stationary and the method proceeds to 306 to continue vehicle operation under the current conditions. The method returns to the start.

Alternatively, in some examples, confirmation of the engagement of the parking brake may not be included, e.g., omitted from the method. Furthermore, engagement of the PTO2 may be initiated, if requested as described below, after the drive system is adjusted to a hill hold configuration. For example, the parking brake may not be engaged and a request for operation of the PTO2 may be detected. In response to the request, the drive system may be placed in a hill hold mode first, and then the PTO2 may be engaged.

Returning to 304, if the parking brake is engaged, the vehicle is stationary and the method continues to 308 to determine if engagement of the PTO2 is requested. For example, a switch, a button, a lever, etc., may be activated by an operator to indicate the request for PTO2 engagement. If the request for PTO2 engagement is not detected, the method proceeds to 306 to continue vehicle operation under the current operating conditions. If PTO2 engagement is indicated, the method continues to 310 to adjust the drive system to the hill hold mode. It will be noted that the hill hold mode is applied regardless of a slope of the stationary vehicle, e.g., the vehicle may be parked on a flat or graded surface.

Adjusting the drive system to the hill hold mode may include opening (e.g., disengaging) an input coupled clutch, such as the input coupled clutch 146 of FIG. 1, and closing (e.g., engaging) each of a mid clutch and a low clutch of the transmission, such as the mid clutch 170 and low clutch 172 of FIG. 1. By opening the input coupled clutch, the second electromotor may be decoupled from a mid-range planetary (e.g., the output planetary 120 of FIG. 1) of the transmission. By closing the mid clutch, a portion of the mid-range planetary may be locked to a stationary portion of the transmission, such as the transmission housing. For example, a ring gear of the mid-range planetary (e.g., the ring gear 124 of FIG. 1) may be held stationary.

By closing the low clutch, a carrier of a low-range planetary of the transmission (e.g., the carrier 138 of the output coupling planetary 130 of FIG. 1) may also be locked to the stationary portion of the transmission. Furthermore, grounding of the ring gear of the mid-range planetary may lock a plurality of planetary gears (e.g., the plurality of planetary gears 126 of FIG. 1) of the mid-range planetary as well as a carrier of a power split planetary (e.g., the carrier 118 of the power split planetary 110 of FIG. 1) coupled to the plurality of planetary gears of the mid-range planetary. As a result, an output shaft (e.g., the output shaft 148 of FIG. 1) of the transmission may be mechanically locked and maintained stationary without drawing torque from the first or second electromotors or the engine. As a result, the transmission may be maintained in the hill hold configuration for a prolonged period of time without causing overheating of the electromotors or the engine.

At 312, the second electromotor is activated and adjusted to operate in a speed control mode. For example, a proportion-integral controller may be set (e.g., as a set point in a feedback speed controller) an output speed of the second electromotor to 0 kph with a tunable deadband. The set point may be maintained by the controller with speed feedback measured by a speed sensor (e.g., speed sensor 176 of FIG. 1). The controller may compare the set point to a measured speed received from the speed sensor to generate an error signal that is driven to zero by the controller to maintain zero speed by adjusting the torque of the second electromotor.

When the hill hold mode is activated as described at 310 (e.g., with the output shaft locked, thereby maintaining the vehicle wheels stationary), the second electromotor may not experience any load. A load may be imposed, however, when the transmission is adjusted out of the hill hold mode, e.g., to a drive mode, and the output shaft is no longer mechanically locked by engagement of both the low clutch and the mid clutch. In one example, the inhibited movement of the wheels of the vehicle during operation of the hill hold mode may enable the operator to release the service brake while the transmission is in the hill hold mode. The mechanism may therefore support a hill hold, e.g., holding the vehicle stationary regardless of slope, until either the vehicle is shutdown with the parking brake engaged or vehicle launch is requested, for example. The torque generated by the second electromotor to maintain zero speed may be used to estimate a slope at which the stationary vehicle is stopped and estimate a launch torque for subsequent vehicle propulsion, described further below. By adjusting the second electromotor to the speed control mode, the torque that the second electromotor produces to hold the speed at zero may be stored in the controller's memory as a learned torque output. In some examples, the output magnitude may be positive torque, and in other examples, the output magnitude may be negative torque.

At 314, the method includes closing the PTO2 clutch. By closing the PTO2 clutch, the PTO2 may be coupled to a power source via a secondary output shaft (e.g., the secondary output shaft 152 of FIG. 1). For example, while the output shaft is grounded in the hill hold mode, the secondary output shaft is not locked and may be rotated to transmit torque to the PTO2 by the power source. In one example, the power source may be the engine which may already be powering an auxiliary load via the PTO1 and may also deliver torque to the PTO2 concurrently via a connecting shaft (e.g., the connecting shaft 154 of FIG. 1), the power split planetary, and the secondary output shaft. In another example, the PTO1 may not be active and the engine may be activated or continue to be operated (if already active) to deliver torque to the auxiliary load at the PTO2. Alternatively, the first electromotor may be activated or continue to operate (if already active) to transmit torque to the PTO2. In yet other examples, the PTO2 may be driven via an electrical energy storage device, such as a battery, when the vehicle is operated in a battery electric mode where the engine is deactivated.

As described above, utilizing the mid and low clutches to ground the output shaft of the transmission in the hill hold configuration allows the engine and the first electromotor to be used for other operations demanding torque input. Furthermore, the second electromotor may be available to control a subsequent launch of the vehicle, as described below.

At 316, the method includes confirming if vehicle launch is requested. For example, a request for vehicle launch may be indicated by operator-actuated release of the parking brake and engagement of service brakes of the vehicle. For example, the service brakes may be hydraulic or air brakes which may be engaged by depressing a pedal. The service brakes may be adapted with a pedal position sensor that provides a signal to the controller indicating a position of the pedal. Furthermore, the request for vehicle launch may include shifting of the gear box to a drive gear, as performed by the operator. Engaging of the service brakes may be demanded before the gear box may be shifted to the drive gear, where the drive gear may indicate either forward or reverse propulsion of the vehicle.

As described above, in some examples, the drive system may be configured to simulate creep torque during vehicle launch. For example, the speed set point of the second electromotor 150, while in the speed control mode, may be increased in response to a change in position or pressure at the service brakes as the service brakes are released. As a result, the vehicle may creep forward or backward (depending on the selected drive gear) during release of the service brakes where a rate of vehicle creep may be proportional to an extent that the service brakes are released.

If the request for vehicle launch is not received, the method returns to 312 to maintain the PTO2 clutch closed and continue operating the auxiliary load with the vehicle maintained stationary and the second electromotor operating in the speed control mode with the zero speed set point. For example, if the service brakes are not engaged and the drive gear is not selected, vehicle launch is not initiated, regardless of a status of the parking brake. In another example, if the parking brake is not released, the service brakes are not engaged, and the drive gear is not selected, vehicle launch is not initiated. In yet another example, if the drive gear is not selected, vehicle launch is not initiated, regardless of the status of the parking brake or a status of the services brakes.

It will be appreciated that the service brakes are a non-limiting example of various types of interlock mechanisms that may be used to determine if vehicle launch is desired. Other examples may include confirmation based on adjustments to one or more of the parking brake, of a transmission mode to neutral prior to selection of a drive mode, etc.

If the request for vehicle launch is received, the method proceeds to 318 to adjust the drive system from the hill hold mode to a drive mode. Adjustment to the drive mode may include, for example, opening (e.g., disengaging) one of the low clutch or the mid clutch. In one example, the low clutch may be opened, thereby mechanically unlocking the output shaft of the transmission. In another example, the mid clutch may be opened instead.

In addition, a hill hold torque output of the second electromotor may be learned at 318. For example, upon adjustment of the drive system to the drive mode with the second electromotor in the speed control mode, the output shaft is no longer locked and the vehicle wheels are able to rotate. The second electromotor may produce an amount of output torque corresponding to an amount demanded to maintain the second electromotor at the zero set point and, as a result, to hold the vehicle at zero speed. During the release of the drive system from the hill hold mode, the allowed deadband around the speed set point of the second electromotor may be reduced or fully eliminated. The torque generated at the second electromotor may be attributed to a combination of operation of the second electromotor and the transfer of torque from the released clutch (low and/or mid clutch) to the second electromotor.

In one example, as shown in FIG. 4 and described further below, the service brakes may not be released before the drive system is adjusted to the drive mode from the hill hold mode. For example, the request for vehicle launch may be received while the service brakes are still engaged. As such, the hill hold torque output may be learned before the service brakes are released and an amount of torque generated by the second electromotor to provide the learned hill hold torque output may be ramped up according to release of the service brakes. In further examples, the learned hill hold torque output of the second electromotor may be used to estimate road grade, e.g., hill slope, without the use of sensors, e.g., an accelerometer, for sensing road grade.

At 320, the method includes confirming if the throttle pedal is actuated, e.g., engaged. For example, the throttle pedal may include a pedal position sensor, similar to the pedal position sensor of the service brakes, that monitors a position of or pressure at the throttle pedal. If the throttle pedal is not engaged, the method returns to 318 to maintain the second electromotor in speed control, generating torque corresponding to the learned hill hold output torque. A duration of time over which the drive system adjusted to the drive mode with the second electromotor in speed control may depend on variables such as imposed loads, e.g., a power demand of the PTO2, a steepness of an incline if parked facing uphill on a slope, etc. In some examples, such as when the PTO2 power demand is high and/or the slope is steep, the second electromotor, or an inverter coupled to the second electromotor, may be more prone to overheating and therefore may hold the drive mode with the second electromotor set at the zero set point for a shorter duration than when the PTO2 power demand is lower and/or the slope is less steep. When overheating is detected, the PTO2 may be disengaged, thereby alleviating the load on the second electromotor. Additionally or alternatively, a notification or alert may be indicated to the operator to engage an interlock mechanism, such as the service brakes or the parking brake. As another example, in response to determination of impending overheating at the second electromotor and/or the inverter, the drive system may be returned to the hill hold mode if other mitigating actions, such as engagement of the service brakes, are not performed. If the throttle pedal is engaged, the method continues to 322 to adjust operation of the second electromotor to a torque control mode.

When adjusted to the torque control mode, the second electromotor may be operated to provide an amount of torque matching a sum of the amount of torque determined during operation in the speed control mode to maintain the zero speed set point and also provide an additional amount of torque corresponding to engagement of the throttle pedal. For example, following opening/disengagement of the low or mid clutch, the controller may learn the hill hold output torque as described above at 318. The second electromotor is adjusted to the torque mode to output an amount of torque equal to a sum of the hill hold output torque and a requested amount of torque indicated by depression of the throttle pedal. For example, the amount of requested torque may correspond to an amount of throttle pedal depression. As the vehicle launches, the hill hold output torque may be gradually reduced to zero, with only the requested torque applied to the second electromotor thereafter. The ramp down of the hill hold output torque may be executed according to a shift algorithm and may be optionally calibrated. The method ends.

Examples of adjustments to operating parameters of a vehicle during launch under influence of at least one auxiliary load is shown in FIG. 4 by graph 400. The vehicle may include a drive system such as the drive system 100 of FIG. 1, configured as a multi-mode inline electromechanical variable transmission with a first electromotor, a second electromotor, an engine, a PTO1, and a PTO2. Time is plotted along the abscissa, increasing to the right in FIG. 4, and events of significance are indicated. Graph 400 include a plot 402 representing a torque output at the second electromotor, a plot 404 showing a pressure (e.g., a hydraulic pressure) at a mid clutch of the drive system, a plot 406 showing a pressure (e.g., a hydraulic pressure) at a low clutch of the drive system, a plot 408 representing engagement of a throttle pedal, and a plot 410 showing engagement of a service brake pedal. As described above, the service brake pedal is a non-limiting example of a type of interlock mechanism that may be used to mechanically lock the vehicle wheels. Each plot increases upwards along the ordinate. For plots 404 and 406, closing/engaging the mid clutch and the low clutch, respectively, increases the pressure at the clutches. For plots 408 and 410, increasing engagement of the pedals may be indicated by increasing depression of the pedals.

At t0, the vehicle is stationary and delivering torque to an auxiliary load powered via the engine or the first electromotor. For example, a gear box of the vehicle may be in a park gear and the vehicle may be stopped on a slope. The drive system may be in a hill hold mode, as described above. The service brake pedal (plot 408) and the throttle pedal (plot 410) are not engaged. The mid clutch (plot 404) and the low clutch (plot 406) are closed to lock an output shaft of the transmission. By closing the mid and low clutches, a load opposing rollback of the vehicle on the slope is imposed on the clutches, resulting in no load (e.g., no torque output demanded) at the second electromotor (plot 402).

At t1, vehicle launch is requested, which includes engagement of the service brake pedal. Engagement of the service brake pedal is demanded to enable shifting of the gear box to a drive gear. The service brake pedal remains engaged between t1 and t2 during which the throttle pedal is not depressed. In response to the depression of the service brake pedal, the transmission is adjusted to a drive mode from the hill hold mode. The adjustment to the drive mode includes release of the low clutch, resulting in a decrease in the low clutch pressure between t1 and t2. The mid clutch remains closed. The load supported by the low clutch to lock the output shaft is transferred to the vehicle's service brakes upon engagement of the service brake pedal, concurrent with release of the low clutch. As a result, no load is imposed on the second electromotor.

It will be appreciated that the transfer of the entire load from the low clutch to the service brakes is representative of a scenario specific to that represented in FIG. 4. The extent of the load transfer may be dependent on depression of the service brake pedal. For example, when the service brake pedal is depressed only a portion of a maximum depression of the service brake pedal, the load may be only partially transferred to the service brakes while maintaining a remaining amount of the load at the second electromotor.

At t2, the service brake pedal is released and the service brake pedal position is fully released by t3. In response, the second electromotor is activated to generate torque while operating in a speed control mode, as described above. An output torque of the second electromotor ramps up according to release of the service brake pedal, allowing the load supported by the service brakes to be shifted to the second electromotor. By t3, the second electromotor is generating a learned amount of torque according to a zero speed set point, thereby holding the vehicle at zero speed and inhibiting rollback with the service brake pedal disengaged. Between t2 and t4, the throttle pedal is not engaged. The mid clutch remains closed and the low clutch remains open after t2 while the service brake pedal remains released after t3.

At t4, two scenarios are shown at plot 402 and plot 408. In a first scenario, as depicted by segment 402a at plot 402 and segment 408a at plot 408, the throttle pedal is depressed. A corresponding amount of torque is generated by the second electromotor which is superimposed over the amount of torque output demanded to maintain the vehicle stationary along the slope. As the throttle pedal is further depressed, the torque output of the second electromotor increases.

In a second scenario, as depicted by segment 404b at plot 402 and segment 408b at plot 408, the throttle is not depressed. The torque output at the second electromotor remains uniform, corresponding to the amount of torque enabling the vehicle to remain stationary. As such the torque output of the second electromotor is less in the second scenario than in the first scenario.

In this way, a transmission may be operated while supporting one or more auxiliary devices to output sufficient torque to launch a vehicle from standstill according to a desired direction. The transmission may be a multi-mode inline electromechanical variable transmission receiving torque from an engine, a first electromotor, and a second electromotor. The transmission may include one or more PTOs configured to deliver power to the auxiliary devices. A low clutch and a mid clutch of the transmission may be used to lock an output of the transmission when the transmission is in a hill hold mode, thus a load is not imposed on the engine or the electromotors to maintain the vehicle stationary. The one or more PTOs may continue to deliver power to the auxiliary devices independent of a status of the output shaft. By decoupling locking of the output shaft from operation of the auxiliary devices, vehicle launch may be enabled by the second electromotor. The second electromotor may be operated in a speed control mode to learn an amount of output torque to hold the vehicle stationary when the transmission is adjusted to a drive mode. Upon receiving a request for vehicle propulsion, the second electromotor may be adjusted to a torque control mode which may include adding an amount of additional, requested torque to the learned amount of torque. As a result, a direction and magnitude of the output torque is not influenced by operation of the auxiliary devices, allowing the torque generated by the second electromotor to provide a vehicle launch from standstill in a stable and natural manner and without relying on slope sensors.

A technical effect of launching the vehicle based on adjustment and corresponding operation of the multi-mode inline electromechanical variable transmission is that smooth vehicle launch without rollback is enabled while supporting an auxiliary load in response to a requested amount and direction of torque.

The disclosure also provides support for a method for a vehicle, comprising: adjusting an output torque of a first electric machine, while disengaging clutches of a transmission or a service brake to mechanically unlock an output shaft of the transmission, to produce a desired vehicle speed and direction of propulsion while operating an auxiliary load powered via the transmission. In a first example of the method, the method further comprises: learning a torque output of the first electric machine enabling the desired vehicle speed to be maintained at zero when the clutches or the service brake is disengaged. In a second example of the method, optionally including the first example, adjusting the output torque of the first electric machine includes increasing the output torque to the learned torque output when the clutches or the service brake is disengaged. In a third example of the method, optionally including one or both of the first and second examples, adjusting the output torque of the first electric machine to produce the desired vehicle speed includes superimposing a requested amount of torque output with the learned torque output, and wherein the requested amount of torque output is indicated based on engagement of a throttle pedal. In a fourth example of the method, optionally including one or more or each of the first through third examples, disengaging the clutches of the transmission includes disengaging a mid clutch and a low clutch of the transmission. In a fifth example of the method, optionally including one or more or each of the first through fourth examples, the vehicle is a hybrid electric vehicle and the transmission is a multi-mode inline electromechanical variable transmission. In a sixth example of the method, optionally including one or more or each of the first through fifth examples, operating the auxiliary load includes transferring torque from one of an engine or a second electric machine through the transmission and a power take-off to the auxiliary load. In a seventh example of the method, optionally including one or more or each of the first through sixth examples, the method further comprises: activating the power take-off when the output shaft is locked, prior to adjusting of the output torque of the first electric machine.

The disclosure also provides support for a method for a vehicle, comprising: responsive to a request for operating an auxiliary device while the vehicle is stationary, delivering torque to the auxiliary device while engaging clutches of a transmission to mechanically lock an output shaft of the transmission, the transmission having a plurality of power inputs including a first electric machine, a second electric machine, and an engine, and responsive to a request for vehicle launch, disengaging the clutches of the transmission to mechanically unlock the output shaft and adjusting a total torque output of the second electric machine, the total torque output of the second electric machine including a learned torque output and a requested torque output, to operate the vehicle at a desired speed and direction of propulsion. In a first example of the method, delivering torque to the auxiliary device includes transmitting torque from one of the engine or the first electric machine to the auxiliary device. In a second example of the method, optionally including the first example, engaging the clutches of the transmission to mechanically lock the output shaft includes adjusting the transmission into a hill hold mode to maintain the vehicle stationary while stopped on a slope and wherein the clutches of the transmission includes a low clutch and a mid clutch of the transmission. In a third example of the method, optionally including one or both of the first and second examples, disengaging the clutches responsive to the request for vehicle launch includes receiving the request based on engagement of service brakes of the vehicle and shifting of a gear box to a drive gear. In a fourth example of the method, optionally including one or more or each of the first through third examples, disengaging the clutches includes opening the clutches before the service brakes are disengaged. In a fifth example of the method, optionally including one or more or each of the first through fourth examples, disengaging the clutches includes opening the clutches after the service brakes are disengaged. In a sixth example of the method, optionally including one or more or each of the first through fifth examples, adjusting the total torque output of the second electric machine further includes ramping up a speed set point and a torque generated at the second electric machine according to a rate of disengagement of the service brakes. In a seventh example of the method, optionally including one or more or each of the first through sixth examples, adjusting the total torque output of the second electric machine includes adding an amount of torque output to the learned torque output according to depression of a throttle pedal and wherein the added amount of torque output corresponds to the requested torque output. In a eighth example of the method, optionally including one or more or each of the first through seventh examples, engaging the clutches of the transmission includes grounding the clutches to a stationary portion of the transmission.

The disclosure also provides support for a system for a vehicle, comprising: a transmission having clutches and a plurality of power inputs, one or more power take-offs configured to deliver torque to one or more auxiliary devices, a service brake, a prime mover coupled to a first power input of the transmission, an electric machine coupled to a second power input of the transmission, and a controller with instructions stored in non-transitory memory that, when executed, cause the controller to: during a vehicle stopped condition, operate the one or more auxiliary devices with the clutches engaged to mechanically lock the transmission, and release the clutches, and while releasing, concurrently adjust an output magnitude of the electric machine responsive to a speed control mode to hold vehicle speed at zero while continuously operating the one or more auxiliary devices. In a first example of the system, the controller has further executable instructions to: responsive to release of the service brake, concurrently adjust the output magnitude of the electric machine responsive to the speed control mode to control to hold vehicle speed at zero while continuously operating the one or more auxiliary devices. In a second example of the system, optionally including the first example, the controller executes the instructions independent of road grade and wherein the vehicle does not include an accelerometer to determine road grade.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
adjusting an output torque of a first electric machine, while disengaging clutches of a transmission or a service brake to mechanically unlock an output shaft of the transmission, thereby producing a desired vehicle speed and direction of propulsion while operating an auxiliary load powered via the transmission.

2. The method of claim 1, further comprising learning a torque output of the first electric machine enabling the desired vehicle speed to be maintained at zero when the clutches or the service brake is disengaged.

3. The method of claim 2, wherein adjusting the output torque of the first electric machine includes increasing the output torque to the learned torque output when the clutches or the service brake is disengaged.

4. The method of claim 3, wherein adjusting the output torque of the first electric machine to produce the desired vehicle speed includes superimposing a requested amount of torque output with the learned torque output, and wherein the requested amount of torque output is indicated based on engagement of a throttle pedal.

5. The method of claim 1, wherein disengaging the clutches of the transmission includes disengaging a mid clutch and a low clutch of the transmission.

6. The method of claim 1, wherein the vehicle is a hybrid electric vehicle and the transmission is a multi-mode inline electromechanical variable transmission.

7. The method of claim 1, wherein operating the auxiliary load includes transferring torque from one of an engine or a second electric machine through the transmission and a power take-off to the auxiliary load.

8. The method of claim 7, further comprising activating the power take-off when the output shaft is locked, prior to adjusting of the output torque of the first electric machine.

9. A method for a vehicle, comprising:
responsive to a request for operating an auxiliary device while the vehicle is stationary, delivering torque to the auxiliary device while engaging clutches of a transmission to mechanically lock an output shaft of the transmission, the transmission having a plurality of power inputs including a first electric machine, a second electric machine, and an engine; and responsive to a request for vehicle launch;
disengaging the clutches of the transmission to mechanically unlock the output shaft and adjusting a total torque output of the second electric machine, the total torque output of the second electric machine including a learned torque output and a requested torque output, thereby operating the vehicle at a desired speed and direction of propulsion.

10. The method of claim 9, wherein delivering torque to the auxiliary device includes transmitting torque from one of the engine or the first electric machine to the auxiliary device.

11. The method of claim 9, wherein engaging the clutches of the transmission to mechanically lock the output shaft includes adjusting the transmission into a hill hold mode to maintain the vehicle stationary while stopped on a slope and wherein the clutches of the transmission includes a low clutch and a mid clutch of the transmission.

12. The method of claim 9, wherein disengaging the clutches responsive to the request for vehicle launch includes receiving the request based on engagement of service brakes of the vehicle and shifting of a gear box to a drive gear.

13. The method of claim 12, wherein disengaging the clutches includes opening the clutches before the service brakes are disengaged.

14. The method of claim 12, wherein disengaging the clutches includes opening the clutches after the service brakes are disengaged.

15. The method of claim 12, wherein adjusting the total torque output of the second electric machine further includes ramping up a speed set point and a torque generated at the second electric machine according to a rate of disengagement of the service brakes.

16. The method of claim 9, wherein adjusting the total torque output of the second electric machine includes adding an amount of torque output to the learned torque output according to depression of a throttle pedal and wherein the added amount of torque output corresponds to the requested torque output.

17. The method of claim 9, wherein engaging the clutches of the transmission includes grounding the clutches to a stationary portion of the transmission.

18. A system for a vehicle, comprising:
a transmission having clutches and a plurality of power inputs;
one or more power take-offs configured to deliver torque to one or more auxiliary devices;
a service brake;
a prime mover coupled to a first power input of the transmission;
an electric machine coupled to a second power input of the transmission; and
a controller with instructions stored in non-transitory memory that, when executed, cause the controller to:
during a vehicle stopped condition, operate the one or more auxiliary devices with the clutches engaged to mechanically lock the transmission; and
release the clutches, and while releasing, concurrently adjust an output magnitude of the electric machine responsive to a speed control mode to hold vehicle speed at zero while continuously operating the one or more auxiliary devices.

19. The system of claim 18, wherein the controller has further executable instructions to:
responsive to release of the service brake, concurrently adjust the output magnitude of the electric machine responsive to the speed control mode to control to hold vehicle speed at zero while continuously operating the one or more auxiliary devices.

20. The system of claim 18, wherein the controller executes the instructions independent of road grade and wherein the vehicle does not include an accelerometer to determine road grade.

* * * * *